United States Patent [19]
Schmidt et al.

[11] 3,935,049
[45] Jan. 27, 1976

[54] METHOD OF COVERING A SUBSTRATE BY OVERIDGE BONDING OF A COVERING MATERIAL ABOUT THE EDGES OF THE SUBSTRATE

[75] Inventors: Robert L. Schmidt; Hubert J. Beckman, both of St. Charles, Ill.

[73] Assignees: Ashland Oil, Inc., Ashland, Ky.; Riverside Laboratories, Inc., Geneva, Ill.

[22] Filed: July 15, 1974

[21] Appl. No.: 488,875

[52] U.S. Cl. .................. 156/216; 52/416; 156/267; 428/81; 428/121; 428/245; 428/481; 428/482
[51] Int. Cl.².. E04B 2/00; B32B 3/04; B32B 27/12; B32B 31/04
[58] Field of Search ........ 156/216, 267; 161/88, 99, 161/232–233; 52/416, 596; 428/81, 121, 245, 480–481

[56] References Cited
UNITED STATES PATENTS

| | | | |
|---|---|---|---|
| 2,774,410 | 12/1956 | Davies | 156/216 |
| 3,202,561 | 8/1965 | Swanson et al. | 156/216 |
| 3,283,346 | 11/1966 | Marsh et al. | 156/216 X |
| 3,469,361 | 9/1969 | Winkowski | 52/416 |
| 3,476,628 | 11/1969 | Meinhardt et al. | 156/267 X |
| 3,485,698 | 12/1969 | Marsh | 516/267 |
| 3,692,620 | 9/1972 | Schmidt et al. | 161/232 X |

*Primary Examiner*—Philip Dier

[57] ABSTRACT

Laminates are prepared from rigid panels or sheets (e.g. gypsum board or plywood) and resin-saturated paper by a unidirectional pressure process which simultaneously bonds the paper to one of the broad flat sides of the panel or sheet and to one or more of the adjacent thin sides of the panel or sheet which intersect the broad side. The resulting laminates are useful in the construction of walls and furniture.

12 Claims, 5 Drawing Figures

U.S. Patent  Jan. 27, 1976  3,935,049
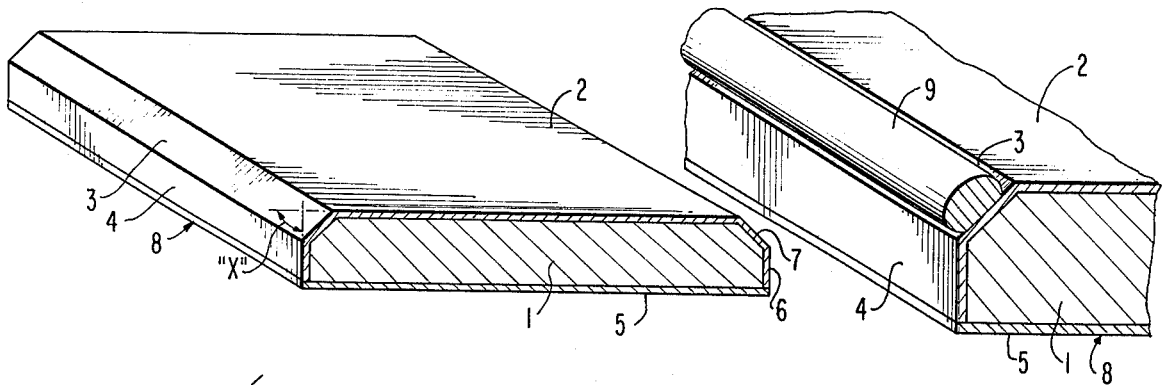
FIG.1  FIG.2
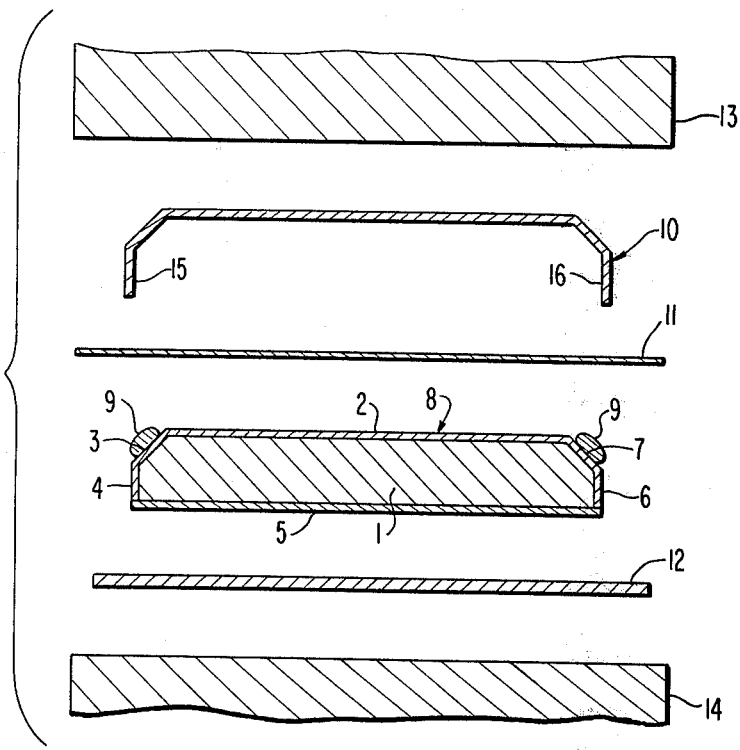
FIG.3
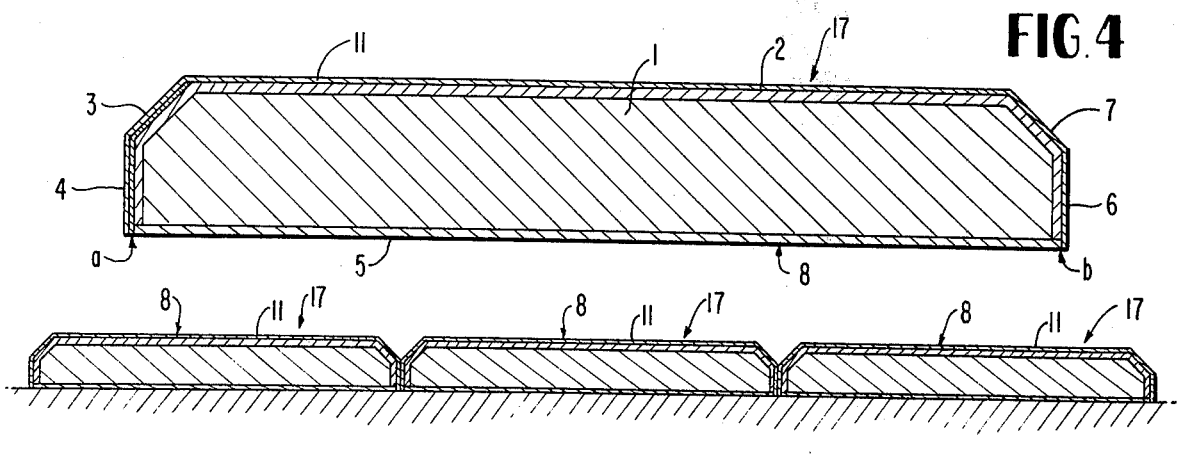
FIG.4
FIG.5

METHOD OF COVERING A SUBSTRATE BY OVERIDGE BONDING OF A COVERING MATERIAL ABOUT THE EDGES OF THE SUBSTRATE

BACKGROUND OF THE INVENTION

Lamination is a general term which denotes the building up of thin sheets or layers of one or more materials (e.g. wood, paper, etc.) with the aid of a bonding material, usually a thermosetting resin, to form a thicker, heavier sheet or board having desirable properties.

Laminates are often prepared by a process which involves coating or impregnating a suitable covering material (e.g. paper or cloth) with a thermosetting resin (e.g. a phenolic resin). A sandwich is then made from one or more sheets of this impregnated covering material and a supporting substrate (e.g. hardboard). This sandwich is then heated under compressive forces (usually unidirectional) to form a hard, dense board or molded form (i.e. it is laminated).

Typically, the covering material is only bonded or laminated to one of the broad sides of the substrate, and the contiguous thin sides and remaining broad side are exposed (i.e. non-laminated). By contrast, when the thin sides (skewed, rounded or normal to the broad side to be laminated) are to be covered, such is ordinarly accomplished by first forming a shaped unsupported laminate in a mold and then gluing this molded form to the supporting substrate (i.e. indirect formation of a supported laminate). Alternatively, and less frequently, edge or side lamination can be obtained directly by complex operations involving the simultaneous application of surface and side pressures (e.g. vertical and lateral pressures).

Suitable covering materials include paper, asbestos paper, woven and non-woven fabrics (e.g. cotton and nylon fabrics), fiberglass, and the like. The more popular resins include phenol-formaldehyde resins, melamine-formaldehyde resins, ureaformaldehyde resins, epoxy resins, and polyester resins. Supporting substrates include wood, plywood, processed hardboard, and gypsum board.

Most commercially available laminating presses are of the unidirectional type. By unidirectional, it is meant that the compressive forces exerted by the press are exerted in only one direction or dimension (e.g. vertical). Ordinarily, one of two parallel, flat, paired press platens is held in a fixed position and compressive forces (i.e. pressure) are generated by moving the other press platen toward the first, thereby squeezing a laminating assembly or sandwich between the platens.

Different resins or plastic-forming systems require different conditions of heat and pressure for curing or hardening. Thus, some phenolic resins require rather severe conditions for curing or hardening (e.g. 1500 psig and 350°F. for five minutes). Consequently, such resins cannot be used with supporting substrates having low compressive strengths (e.g. gypsum board). However, other resins are available which can be cured or hardened under much less severe conditions (e.g. certain unsaturated polyester resins can be cured at 280°F. and 150 psig for five minutes).

Laminates of this general type are known and many of them are available commercially. Such laminates are used in the manufacture of furniture, counter-tops, doors, walls and the like. Consequently, the knowledge and selection of suitable covering materials (e.g. paper), suitable resins (e.g. unsaturated polyester resins) and suitable substrates (e.g. plywood), are within the skill of the art when aided by this disclosure.

Some of these prior art laminates have disadvantages which limit their usefulness.

First, some of the supporting substrates which can be used (e.g. 4 × 8 feet sheets of half-inch-thick plywood or gypsum board) exhibit minor but noticeable variations in width. Thus, walls made from these substrates (or made from "one-sided" laminates of these substrates) must be constructed in such a way as to compensate for these minor differences in width. In the case of laminated plywood panels, small strips or moldings (e.g. wood, metal or plastic) are frequently used to hide the seams formed with the thin sides of two laminates are placed in abutting relationship, as in the construction of a wall. Similarly, the seams formed in the construction of walls from ordinary gypsum board are hidden by the use of tape and plaster.

Laminated gypsum board is a recent development and it has been suggested that the non-laminated edges of the laminated gypsum board would be covered with a suitable molding, much in the same manner as plywood laminates. The preparation of laminated gypsum board is described in U.S. Pat. No. 3,692,620, which is incorporated herein by reference.

A second disadvantage of some conventional laminates is the susceptibility of such laminates to damage along their edges where the thin, non-laminated sides intersect the broad laminated surface, usually at right angles (i.e. normally).

A third disadvantage of some laminates is the unsightly absence of edge or side lamination. Consequently, such edges or sides must be disguised or covered in some way when such laminates are used to form, for example, a table or desk top.

SUMMARY OF THE INVENTION

We have now discovered that some disadvantages of the prior art laminates can be reduced or eliminated by an improved laminating process which simultaneously bonds a resin-impregnated covering material (e.g. paper) to one of the broad (usually flat) surfaces of a supporting panel or sheet and simultaneously laminates one or more of the adjacent thin sides of the substrate with the same covering material. In this manner, we are able to eliminate one or more of the unsightly, non-laminated thin sides of the prior art laminates, obtain consistent laminate dimensions, and produce laminates having edges which are less susceptible to damage (e.g. by impact). Furthermore, the process of our invention can be practiced in unidirectional presses of conventional design.

Briefly described, our invention involves applying a ribbon or strip of a heat-moldable resin or plastic (usually a paste) along one or more of the edges or thin surfaces which border the broad flat surface of the substrate, which surface is to be laminated. Desirably, the thin sides of the substrate (which thin sides define the edge) will not be normal to the flat surface. Thin sides which are otherwise normal to the broad flat surface to be laminated can be suitably altered by simply rounding or beveling the edges involved. Next resinimpregnated paper is positioned over the wide or broad flat surface of the substrate which is to be laminated. The resinimpregnated sheet should be wider than that normally used to laminate only the flat surface of the substrate. According to this invention, the resin-impregnated sheet will extend out beyond the beveled or rounded edge (e.g. by the thickness of the substrate being laminated). The resin-impregnated sheet and supporting substrate are then inserted into a conventional unidirectional laminating press. However, instead of using a conventional flat or embossed caul plate, a caul plate is used which is adapted (e.g. channel shaped) to bend or press the extended edges of the resin-impregnated paper around and against the beveled edges of the supporting substrate, as well as perform the ordinary function of pressing the resin-impregnated paper firmly against the broad flat surface of the supporting substrate.

When laminated in the usual manner, the resulting product will have one or more of the thin sides laminated, as well as the broad flat surface. Furthermore, the laminate will have assumed the shape defined by the U-shaped caul plate as a result of plastic or resin flow and can thereby be given consistent dimensions which will be fixed or determined by the dimensions of the caul plate.

The present invention can be further understood by reference to the attached Drawing and the following description:

DESCRIPTION OF THE DRAWING

FIG. 1 is an isometric view of a sheet of gypsum board before lamination, which sheet has bevelled or chamfered edges.

FIG. 2 is a fragmentary isometric view of the gypsum board of FIG. 1 to which a strip or ribbon of heat-moldable resin has been applied.

FIG. 3 is an exploded view of the laminating assembly (i.e. "sandwich") and press platens of a typical laminating operation of this invention.

FIG. 4 is a cross-sectional view of gypsum board which has been laminated according to this invention.

FIG. 5 is a top cross-sectional view of a wall which has been constructed from gypsum board laminated according to this invention.

DETAILED DESCRIPTION OF THE INVENTION

The laminates of this invention can be prepared from a variety of supporting substrates. Thus, plywood, chipboard, hardboard, and gypsum board can be used. Gypsum board is the preferred substrate because of its low cost and fire resistant characteristics. Accordingly, this invention will be described with particular reference to gypsum board and the simultaneous lamination of one broad flat side and two opposite or parallel sides or edges thereof, without intending to be limited thereby.

The following description is made with reference to the attached Drawings in which like numerals refer to like elements.

Referring now to FIG. 1, an ordinary flat sheet of gypsum wall board consists of a core 1 (e.g. a core of calcium sulfate) having adherent paper surfaces 2, 3, 4, 5, 6 and 7. For convenience, the entire sheet of gypsum board is hereinafter referred to by the numeral 8. Gypsum wall board is commonly manufactured and solid in four-foot-wide by eight-foot-long sheets (¼ – ¾ inches thick), although other sizes are known. Usually, paper surfaces 2, 3, 4, 6 and 7 are of better quality paper than paper surface 5. Frequently, the "finished" side of gypsum wall board will be highly calendered and/or contain small amounts of resins etc. to give a smoother wall (e.g. smoother after painting). Although the gypsum wall board shown in FIG. 1 is manufactured with bevelled edges (i.e. with chamfered surfaces 3 and 7), other edge forms are known (e.g. tapered edges). The use of flat gypsum wall board is preferred over, for example, tapered-edge gypsum wall board.

If a supporting substrate (e.g. plywood) is to be used which does not have chamfered surfaces such as surfaces 3 and 7 of FIG. 1 (or their equivalent), such surfaces should preferably be formed or created in the preparation of the plywood for use according to this invention. Thus, the sharp or right angle edges found in common plywood should be removed by sanding, grinding or the like to thereby obtain rounded or bevelled edges and surfaces similar to those (3 and 7) shown in FIG. 1. If the bevelling or rounding of the edges is not accomplished, it is usually necessary to use substantially more molding resin between the resin impregnated covering material and the substrate, all as hereinafter described. Further, the use of bevelled or rounded edges greatly facilitates the positioning or selfpositioning of the caul sheet (hereinafter described) during the laminating process. Thus, although beveling and rounding are not absolutely essential steps or prerequisites to the practice of this invention, they are of major significance in obtaining the best results from the practice of this invention. Only the edges or sides to be laminated need to be bevelled or rounded.

Turning now to FIG. 2, once the beveled or rounded edges (chamfers 3 and 7) of the supporting substrate 8 have been prepared, it is then necessary to apply a heavy preformed film, ribbon, or strip 9 of a heat-moldable or curable resin along chamfer 3 (and/or 7), preferably along its entire length. The amount of resin which is applied can vary widely, and the amount used is not critical. However, best results have been obtained when the amount of resin used was sufficient to cause some resin to spread down along surface 4 and be exuded from between the impregnated covering material and the supporting substrate during lamination. In the case of commercial gypsum wall board, a strip or ribbon of heat-moldable resin approximately one-half the size of the wooden shaft of an ordinary lead pencil is usually sufficient.

The heat-moldable resins which can be used for this purpose can be any one of a variety of commercially available resin systems such as unsaturated polyester resins, epoxy resins, aminoplasts, and the like. It is preferred that such resins be in the form of sticky pastes, gels, or very viscous solutions to facilitate their application and positioning.

The laminates are then prepared in the following manner with reference to FIG. 3. A sandwich or laminating assembly is prepared by stacking a dished or U-shaped caul plate 10 (e.g. substantially a "mate" for the top and side surfaces of gypsum wall board 8), resin-impregnated paper 11, gypsum board 8, and asbestos pad 12. The purpose of asbestos pad 12 is to permit the release of any water vapor from gypsum board 8 during lamination. As shown in FIG. 3, beads or ribbons of resin 9 have been applied to chamfers 3 and 7 before assembling the sandwich. The sandwich is then inserted between heated press platens 13 and 14. A wide variety of presses are marketed and multiple-tier presses can be used. The press is then actuated to a suitable pressure (i.e. compressive force) to thereby mold and harden or cure the various resins, thereby bonding the impregnated paper to gypsum board 8. In the case of gypsum board, care must be taken to use a laminating pressure below that at which the gypsum board will crumble (i.e. without crushing the gypsum board). With gypsum board, the upper pressure limit is typically in the range of 600–800 psig, although the precise pressure limit will vary depending upon the exact nature and quality of the gypsum board involved. Preferably, the laminating pressure will be between 50 and 300 psig, usually 80–200 psig. The temperature used can vary widely and will be determined by such factors as the resin selected, the curing catalyst, the desired cycle time, etc. Generally, a press platen temperature of 200°–400°F. will be used (e.g. 275°–325°F). At temperatures of 280°–300°F. and pressures of 100–120 psig, a cycle time in the press of 5–8 minutes is typical. At the end of the cycle time, the pressure is released and the laminated board removed from the press. Then, the laminated gypsum board is set aside and permitted to cool.

As previously indicated, the purpose of U-shaped caul 10 is to transmit the compressive forces of the press platens 13 and 14 to the top and sides of gypsum board 8, to impart a desired surface finish to the laminated gypsum board 17, and to prevent the laminating and molding resins from adhering to the press platens. As those skilled in the laminating art already know, the flow of resin or resin-forming materials which takes during the laminating process causes the surface of the laminate to assume or duplicate the finish of the caul sheet. Aluminum cauls (e.g. 0.02 to 0.10 inches thick) are recommended for best results. They give excellent release, are light in weight and are easily rubbed to a desired sheen. For low gloss effects, aluminum can be etched and anodized. Similarly, the cauls can be shaped to impart embossed surfaces or patterns to the laminate (e.g. a waffle-iron shaped caul can be used to impart a waffle-like appearance to the resulting laminate). New cauls should be washed with solvent (e.g. lacquer thinner) and treated with mold release agents such as stearic acid. Alternatively, or additionally, mold release agents can be included in the resin impregnated paper 11. In addition to using the caul sheets to obtain various gloss and pattern effects, several types of release papers are on the market which can be inserted between caul sheet 10 and resin-impregnated paper 11 during lamination. The use of release papers is especially useful in imparting a wood grain feel to the resulting laminates when simulating wood paneling. Ordinarily, U-shaped caul 10 will be slightly larger than (e.g. 1/16 inch wider) and "matched" to the supporting substrate (e.g. gypsum board 8). However, the caul does not need to be a "matched" caul and the laminate 17 can be made to conform to an "unmatched" caul by using more resin 9 to serve as a filler. For best results, angle X, as shown in FIG. 1, should not exceed 90°. If angle X is greater than 90°, it becomes much more difficult to obtain satisfactory edge lamination, and substantially more molding resin 9 is required.

Resin-impregnated papers (e.g. impregnated paper 11) can be prepared by dipping or otherwise coating, impregnating or saturating paper with solutions of thermosetting resins as is known in the art. Such impregnated or saturated papers are commercially available. Briefly, these known procedures for producing resin-saturated laminating papers involve dipping or otherwise contacting paper or other covering material (e.g. woven and non-woven fabrics) with a coating composition which is typically a solvent solution of thermosetting resin or resinforming ingredients and catalyst, plus other optional inert or active ingredients. The wet paper is then dried (e.g. oven dried) to remove any inert solvent without substantially curing or hardening the resin.

The resins which can be used in this invention are the thermosetting resins which can be hardened, set or cured at the temperatures and pressures herein contemplated for use. The selection of operable resins is within the skill of the art when aided by this disclosure, although all do not serve with equal efficiency. Thus, phenolic, melamine and polyester resins can be used. Mixtures of resins can be used. I have obtained best results using unsaturated polyester resins as the only or predominant resin. As is known in the art, unsaturated polyester resins are used in admixture with copolymerizable monomers (e.g. styrene, diallyl phthalate, vinyl toluene, methyl methacrylate, etc.). They can be cured or hardened, usually with the aid of catalysts (e.g. benzoyl peroxide or cumene hydroperoxide). For a more comprehensive discussion of unsaturated polyester resins, see the text POLYMERS & RESINS by Brage Golding, copyright 1959 by D. Van Nostrand Company, Inc. Pages 303–314 are incorporated herein by reference for their disclosure of unsaturated polyester resins, polymerizable monomers, catalysts, etc.

Ordinarily, the coating resins will be used to impregnate decorative papers rather than plain papers. For example, paper printed to resemble wood paneling can be used to create wood-like laminates. Although paper is the preferred base material for saturation, other fibrous materials in sheet form can be used, e.g. woven and non-woven fabrics. The dry uncured resin impregnated paper can be made with varying resin contents. To be effective, the dry saturated paper (e.g. impregnated paper 11) should contain at least 25 weight %, preferably more than 50 weight % (e.g. above 80 weight %) of deposited solids (the solids are usually polyester resin, monomer and additives) based on the weight of the uncoated paper. When higher quality laminates are desired (e.g. for improved abrasion resistance), resin impregnated overlay sheets can be inserted in the laminating assembly shown in FIG. 3 between the impregnated decorative paper 11 and caul sheet 10 (or the release sheet, when such is used). The purpose of using impregnated overlay sheets is to provide a thicker, resin rich surface on the laminates, thereby making them tougher and more abrasion resistant. Such overlay sheets are commercially available and typically contain from 15–30% by weight of paper or other fiber, with the balance to make 100% of deposited solids (primarily resin). For most purposes, the paper (or other fiber) and resin used in overlay sheets should be selected so that their refractive indices match on curing to thereby give a clear or transparent coating over the decorative paper below. Suitable base materials for use in making clear overlays are alpha cellulose, fiber glass, rayon and "Orlon" (a registered trademark).

If desired, the receiving paper surface (e.g. surfaces 3, 2 and 7 as shown in FIG. 1) on the gypsum board can be pre-coated with a resin-containing coating composition just prior to formation of the laminate assembly and lamination.

FIG. 4 is a cross-sectional view of a laminated gypsum board (generally designated as 17) having its two long thin parallel sides laminated. In FIG. 4, the resin-impregnated paper 11 is firmly bonded to paper surfaces 6, 7, 2, 3 and 4. After lamination is complete, some slight excess molding resin will often be noticed at points *a* and *b* as shown in FIG. 4. This is molding resin which has exuded from between impregnated paper 11 and surfaces 4 and 6. This is desirable and indicates that sufficient molding resin (resin 9 of FIGS. 2 and 3) was available to cause the laminated gypsum board to accurately and fully assume the shape defined by caul plate 10. In FIG. 4, note how hardened molding resin 9 has filled in between surface 4 and impregnated paper 11. Thus, the laminated gypsum board produced by this process will always have consistent dimensions, which dimensions will be fixed by the shape and distance between inner confining surfaces 15 and 16 of caul plate 10 as shown in FIG. 3.

FIG. 5 is a top cross-sectional view of a wall constructed from laminated gypsum boards 17 prepared according to this invention. It can be seen that such a wall is free from unsightly gaps between adjacent boards caused by dimensional variations. Further, the edges of such wall boards are protected and have a pleasing appearance.

The present invention will be further understood by reference to the following specific examples which include a preferred embodiment. Unless otherwise indicated, all parts and percentages are by weight.

EXAMPLE 1

Preparation of Impregnated Paper

A coating composition suitable for use in this invention can be made as follows by known prior art techniques:

| INGREDIENT | PARTS |
| --- | --- |
| solid unsaturated polyester resin (e.g. an isophthalic acid resin) | 83 |
| copolymerizable monomer (e.g. di-allyl phthalate) | 17 |
| inert organic solvent (e.g. acetone) | 50 |
| catalyst (e.g. benzoyl peroxide) | as needed, i.e. a catalytic amount (e.g. 2 parts) |
| other optional additives (e.g. hydroquinone) | usually, less than 10 |

Suitable resins, monomers, and catalysts include those previously described. Peroxide catalysts are usually employed to speed the cure during lamination. Suitable inert organic solvents include the various ketones, methylene chloride, acetone, etc. Additives used can include flow control agents or thickeners (e.g. magnesium silicates or silicon dioxide) which prevent excessive resin flow during lamination, and inhibitors to improve storage stability (e.g. hydroquinone).

A sheet of paper (e.g. alpha cellulose paper) or other covering material can then be passed through a dip tank (containing this coating composition) at a controlled rate to deposit the desired amount of coating composition on the paper. The paper is then passed through an oven (e.g. at 250°F.) to remove inert organic solvent without substantially curing the resin. After drying, the saturated or coated paper can be wound on rolls (using a slip sheet) and stored until needed.

Similar results can be obtained using other thermosetting resin systems capable of curing under the conditions of temperature and pressure herein contemplated. Likewise, similar results can be obtained using other covering materials (e.g. rayon fabric).

EXAMPLE 2

Preparation of Gypsum Board Laminate with Side Laminations

A single-sheet laminate without overlay was prepared using commercially available gypsum wall board (with bevelled edges as shown in FIG. 1) and a paper saturated with polyester resin.

The laminate was prepared in a single tier oil-heated press operating at a platen temperature of 280°–300°F. and a pressure of about 100–120 psig. The laminate was prepared using a sandwich (see FIG. 3) made up of aluminum caul 10, impregnated paper 11, gypsum board 8 and cotton asbestos pad 12. The latter served to prevent contact between gypsum board 8 and press platen 14 and permitted the escape of steam from the gypsum board.

U-shaped caul 10 was made by bending the edges of a conventional flat caul so that the caul 10 matched gypsum board 8, but was slightly wider (e.g. 1/16 inch wider) to accommodate for the added thickness of impregnated paper 11 and some of resin 9.

The paper used was decorative alpha cellulose paper (commercially available) impregnated with an inert organic solvent solution of a solid (powdered) unsaturated polyester resin prepared from isophthalic acid, maleic acid or anhydride and propylene glycol, a peroxide catalyst and a copolymerizable monomer (di-allyl phthalate) to a 50–60% solids content (i.e. resin, monomer, catalyst and additives) based on the weight of the dry, resin-impregnated paper. Decorative paper of this type (after impregnation) typically weighs 160 pounds per 3,000 square feet of paper (i.e., approximately 18 square feet of resin-impregnated paper per pound of such impregnated paper).

Resin 9 was spread on chamfers 3 and 7 as shown in FIGS. 1 and 3. Resin 9 was a paste made by thickening a catalyzed unsaturated polyester/styrene mixture with colloidal silica. It was applied by extruding it from a tube to a thickness of about 3/16 inch.

The sandwich was placed in the press and heated under pressure for about 5 minutes. The pressure was then released and the sandwich removed. Caul 10 was lifted from the laminated board while the laminated gypsum board was still hot. The laminated board was then set aside and allowed to cool.

After the laminated board had cooled, some excess resin was observed at point *a* and this was removed with an abrasive. The resulting laminate was of good quality, with the top and both sides being laminated. The side laminations were adherent, uniform in size, and pleasing to the eye.

Although the present invention has been described with particular reference to certain materials and conditions, it will be appreciated that numerous obvious variations and modifications can be made by one skilled in the art without departing from the essence of the present invention.

What is claimed is:

1. Process for preparing a laminate from a rigid sheet and a resin-impregnated covering material wherein the covering material is to be bonded to a broad flat side of said sheet, the improvement which comprises:

A. applying a preformed strip of heat moldable resin along at least one of the thin sides bordering and adjacent to a broad flat side of a support substrate sheet;

B. positioning a resin-impregnated covering material over said flat side, said covering material extending beyond said strip of heat moldable resin; and C. hot pressing said covering material with unidirectional compressive forces against said broad flat surface of said sheet and over said heat moldable resin, thereby simultaneously laminating said at least one of the thin sides and the broad flat surface.

2. The process of claim 1 wherein the thin side to which the heat moldable resin is applied is a beveled or rounded surface.

3. The process of claim 2 wherein said sheet is gypsum wallboard, and said surface is beveled during the original manufacture of said gypsum board.

4. The process of claim 3 wherein said impregnated covering material is paper impregnated with a thermosetting unsaturated polyester resin.

5. The process of claim 4 wherein said heat moldable resin comprises unsaturated polyester resin.

6. The process of claim 4 wherein said heat moldable resin is a viscous mixture of liquid epoxy resin and a curing agent for said resin.

7. The process of claim 4 wherein the two parallel edges bordering and adjacent the broad flat surface of said sheet are beveled or rounded; and wherein said resin-impregnated covering material is bonded to said flat surface and around both of the parallel edges of said sheet.

8. The process of claim 7 which further includes after the hot pressing step, removing any unwanted hardened resin which may have exuded from between the covering material and the sheet along said at least one of the thin sides.

9. The process of claim 2 wherein the maximum pressure of the unidirectional compressive forces is in the range of 600–800 psig.

10. The process of claim 2 wherein the pressure of the unidirectional compressive forces is between 50 and 300 psig and wherein the temperature of the hot pressing is 200°–400° F.

11. The process of claim 2 wherein the pressure of the unidirectional compressive forces is between 80–200 psig and the temperature of the hot pressing is between 275°–325° F.

12. The process of claim 2 wherein the pressure of the unidirectional compressive forces is 100–120 psig, the temperature of the hot pressing is 280°–300° F, and the time of said hot pressing is 5–8 minutes.

* * * * *